Figure 1:
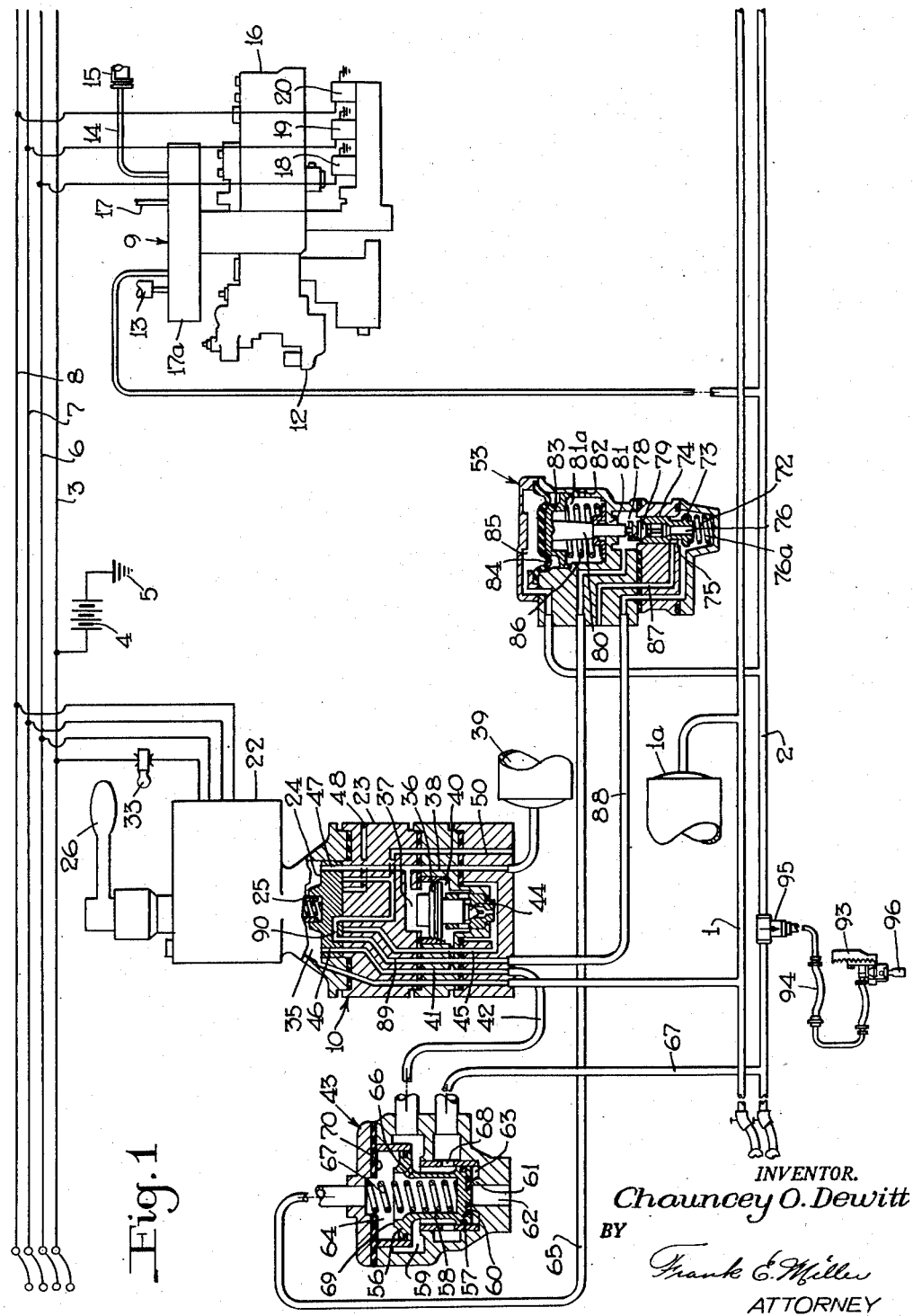

Nov. 20, 1951   C. O. DE WITT   2,575,946
FLUID PRESSURE BRAKE EQUIPMENT
Filed Feb. 15, 1950   2 SHEETS—SHEET 1

INVENTOR.
Chauncey O. Dewitt
BY
Frank E. Miller
ATTORNEY

Nov. 20, 1951   C. O. DE WITT   2,575,946
FLUID PRESSURE BRAKE EQUIPMENT
Filed Feb. 15, 1950   2 SHEETS—SHEET 2
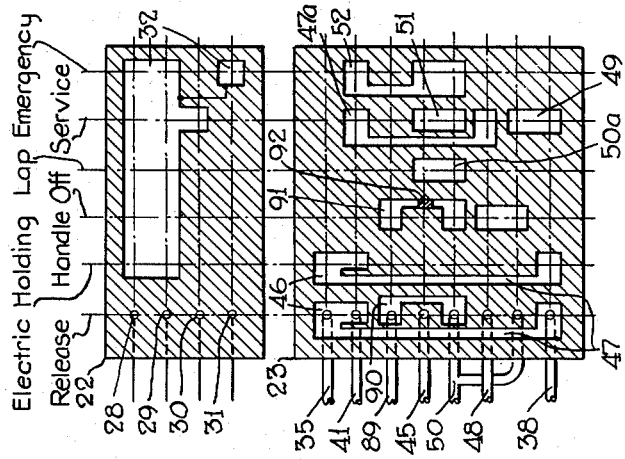
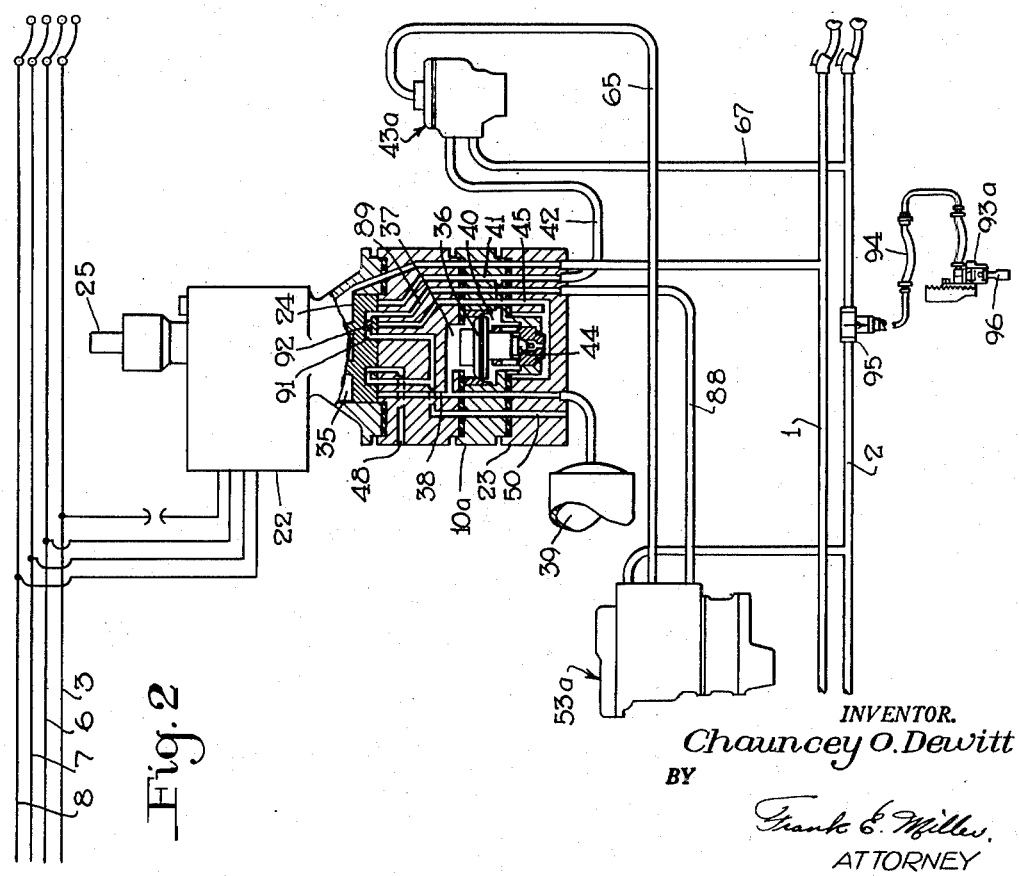
INVENTOR.
Chauncey O. Dewitt
BY
Frank E. Miller,
ATTORNEY Patented Nov. 20, 1951

2,575,946

UNITED STATES PATENT OFFICE 2,575,946

FLUID PRESSURE BRAKE EQUIPMENT

Chauncey O. De Witt, Teaneck, N. J., assignor to Westinghouse Air Brake Company, a corporation of Pennsylvania Application February 15, 1950, Serial No. 144,355

7 Claims. (Cl. 303—18)

This invention relates to fluid pressure brake equipment and more particularly to the electro-pneumatic type for use in connection with braking vehicles adapted to be controlled from either end and to be operated individually or in trains, such as subway cars or the like.

Certain vehicles in the above type of service have for years been equipped with Westinghouse Air Brake Company's "AMUE" Electro-Pneumatic Brake Equipment fully disclosed in their Instruction Pamphlet No. T-5051-13 dated February 1938. This equipment comprises two trip valve devices located at opposite sides of the vehicle, one on each truck, in such a manner that when a road bed trip is set against train movement, said trip will engage a normally depending handle of one of the trip valve devices and operate said device to an open position for effecting an emergency reduction in pressure in the usual brake pipe to thereby cause an emergency application of brakes on the vehicle or train, as the case may be, to promptly bring it to a stop. A trip valve device application of brakes usually occurs, as just described, when the operator's brake valve device is in release position supplying fluid under pressure to the brake pipe. It is undesirable to thus continue supply of fluid under pressure to the brake pipe which is open to atmosphere through the operated trip valve device, so it is customary to promptly move the brake valve device to lap position to cut off the supply of fluid under pressure to the brake pipe when such an application of brakes occurs. Before the car or train is again operated, the operator must leave his control station and go down along the road bed to the trip valve device which had operated to cause the emergency application of brakes and move the handle thereof back to its normally depending position to close the vent from the brake pipe, following which, he will return to his control station in the vehicle or train and move his brake valve device to release position to recharge the brake pipe and brake system for releasing the brakes on the vehicle or train after which he may proceed.

Recently new cars placed in the above type of service have been equipped with what is known as the "SMEE" brake equipment which is substantially like that disclosed in the pending application of Samuel L. Williams et al., Serial No. 47,046, filed August 31, 1948. This brake equipment, in contrast to the "AMUE" brake equipment, embodies an automatically closing or resetting trip valve device, that is, a trip valve device which after operation by a road bed trip to vent the brake pipe for effecting an emergency application of brakes, automatically closes the vent from the brake pipe to eliminate the need for the operator to leave his control station for resetting the trip valve device, as required with the "AMUE" brake equipment, to release the application of brakes. Further, with the "SMEE" brake equipment the operator's brake valve device when in release position does not establish a brake pipe charging communication like the brake valve device in the "AMUE" brake equipment so that it is not necessary, when a trip valve emergency application of brakes is effected, to move the brake valve device out of release position to avoid undesired waste of fluid under pressure. In order to release a trip valve emergency application of brakes with the "SMEE" brake equipment it is however necessary to move the brake valve device to a full service position for recharging the brake pipe and certain other parts of the equipment to a certain pressure while retaining the brakes fully applied, after which the brake valve device will be returned to release position to release the brakes.

It is now desired to use the automatic closing type of trip valve device employed with the "SMEE" brake equipment on vehicles equipped with the old "AMUE" brake equipment in place of the manually resettable type which has been used to date but the mere substitution of one for the other will not be satisfactory since, on account of the brake valve device of the "AMUE" brake equipment establishing a brake pipe charging communication in its release position, an emergency application of brakes initiated by operation of the automatic closing type of trip valve device could be promptly released unless the operator promptly moved the brake valve device out of its release position which can not be depended upon since the operator might be incapacitated.

The principal object of the invention is therefore to so modify the "AMUE" brake equipment as to permit use of an automatic closing type of trip valve device therewith.

Other objects and advantages will become apparent from the following more detailed description of the invention.

In the accompanying drawings; Figs. 1 and 2, when the right-hand edge of Fig. 1 is matched to the left-hand edge of Fig. 2, is a diagrammatic view, partly in section and partly in outline, of an electro-pneumatic brake equipment embodying the invention; and Fig. 3 is a diagrammatic, development view of switch and valve portions of operator's brake valve devices shown in Figs. 1 and 2.

*Description*

As shown in the drawing, 1 is a fluid pressure supply pipe adapted to be constantly supplied with fluid under pressure from any suitable source, such as a reservoir 1a; 2 is a brake pipe; 3 is an electric supply wire connected to one terminal of an electric supply such as a battery 4, the other terminal of which is grounded at 5; 6 is a brake release wire; 7 is a service application wire; and 8 is an emergency application wire, all of said pipes and wires extending to opposite ends of a vehicle for connection with corresponding parts on another vehicle in the case of a train. 9 is a brake controlling valve device and 10 and 10a are two identical operator's brake valve devices adapted to be located at opposite ends of the vehicle. The parts so far enumerated are identical in structure and operation and are connected in the same manner as corresponding parts in the "AMUE" brake equipment disclosed in the above referred to Instruction Pamphlet and since reference may be made to said pamphlet for a detailed description of this equipment, only a brief description of these parts as necessary for an understanding of the invention will now be given herein.

The brake controlling valve device 9 comprises a service application valve device 12 adapted to respond to a service reduction in pressure in the brake pipe 2 to supply fluid from a precharged auxiliary reservoir 13, at a pressure corresponding to the degree of such reduction, to a pipe 14 which, for illustration, may be connected directly to a brake cylinder device 15 whereby such pressure may operate said brake cylinder device to effect an application of brakes. The brake controlling valve device 9 further comprises an emergency application valve device 16 arranged to operate upon an emergency reduction in pressure in brake pipe 2 to supply fluid from a source, such as a pipe 17, to the brake cylinder device 15 for effecting an emergency application of brakes. Upon restoration of pressure in brake pipe 2 the service application valve device 12 and emergency application valve device 16 are adapted to operate to their normal position for releasing fluid under pressure from the brake cylinder device 15 and for recharging auxiliary reservoir 13 with fluid under pressure from the brake pipe.

The service application valve device 12 and emergency application valve device 16 are mounted on opposite sides of a pipe bracket 17a with which there is associated a magnet valve portion comprising a release magnet 18, a service application magnet 19 and an emergency application magnet 20, said magnet valve devices being connected to the release, service and emergency wires 6, 7 and 8 respectively. Upon supply of electric current from battery 4 to the release wire 6 and service wire 7 the release magnet 18 and service magnet 19 are adapted to be energized to, respectively, close a vent from the brake cylinder device 15 and to supply fluid under pressure to said brake cylinder device for effecting a service application of brakes on the vehicle. Upon energization of the release wire 6 and emergency wire 8 by current from battery 4 the release magnet 18 and emergency magnet 20 are adapted to be energized for, respectively, closing a vent from the brake cylinder device the same as in effecting a service application of brakes, and for also supplying fluid under pressure to the brake cylinder device 15 for effecting an emergency application of brakes. Supply of electric current from battery 4 only to the release wire 6 subsequent to effecting a service application of brakes will maintain the vent from the brake cylinder device 15 closed to thereby hold an application of brakes in effect.

The brake valve devices 10 and 10a each comprises an electric switch portion 22 and a valve portion 23 including a rotary valve 24, said switch portion and rotary valve being arranged for operation in unison by a common shaft 25 adapted to be turned by an operator's removable handle 26. Only one handle 26 is provided on a vehicle and is applied to the brake valve device at the selected control end of the vehicle, as shown in the drawing.

The brake valve handle 26, and thereby the electric portion 22 and rotary valve 24 in each brake valve device has spaced apart, Release, Electric holding, Handle off, Lap, Service and Emergency positions, as designated in Fig. 3 by legends. The brake valve handle 26 is shown in Fig. 1 in its Release position and in Fig. 2 in its Handle off position.

The electric portion 22 of each brake valve device 10 and 10a comprises four spaced apart fixed contacts 28, 29, 30 and 31 and a movable contact 32 (Fig. 3) arranged to cooperate with said fixed contacts according to different positions of the brake valve handle 26, as will be presently described. The fixed contact 28 is adapted to be connected to the current supply wire 3 by a removable plug switch 33 only one of which is provided on the vehicle and adapted to be used at the end of the vehicle from which it is desired to control the vehicle brakes. At the opposite or non-control end of the vehicle the fixed contact 28 in the brake valve device will not therefore be connected to the current supply wire 3. The contacts 29, 30 and 31 at both brake valve devices 10 and 10a are connected respectively to the release wire 6, the service application wire 7 and the emergency application wire 8.

In each brake valve device 10, 10a the rotary valve 24 is contained in a chamber 35 which is constantly supplied with fluid under pressure from the fluid pressure supply pipe 1. Each brake valve device further comprises an equalizing discharge valve device embodying a piston 36 subject on one side to pressure of fluid in a chamber 37 which is connected to a passage 38 leading in one direction to the seat of rotary valve 24 and in the opposite direction to an equalizing reservoir 39. At the opposite side of piston 36 is a chamber 40 connected to a passage 41 leading to the seat of rotary valve 24 and also connected to a pipe 42 adapted to be normally open to brake pipe 2 through a brake application valve device 43 at the brake valve device 10 or 43a at the brake valve device 10a. The valve devices 43, 43a constitute a part of the invention and will be described subsequently. Carried by piston 36 is a brake pipe discharge valve 44 arranged to control communication between chamber 40, and thereby the brake pipe 2, and an exhaust passage 45 leading to the seat of the rotary valve 24.

Assuming that the brake valve device 10a is at the non-control end of the vehicle and in Handle off position and that the plug switch 33 is applied only at the opposite or control end, it will be noted that the current supply via wire 3 to said brake valve device is cut off and the release contact 29, service contact 30 and emergency contact 31 are disconnected from each other, while at the rotary valve 24, passage 41 from the brake pipe 2, passage 45 from the brake pipe discharge valve 44 and passage 38 from the equalizing reservoir 39 are all lapped by said rotary valve, so as to provide for control of brakes only by the brake valve device 10 at the opposite or selected control end of the vehicle.

With the brake valve device 10 at the selected control end of the vehicle in Release position, in which it is shown in Fig. 1, a port 46 through the rotary valve opens chamber 35 to the brake pipe passage 41, and assuming that said chamber is charged with fluid under pressure from the supply pipe 1, such fluid will flow through said port to said passage and thence through the brake application valve device 43 to the brake pipe 2 to charge same and to thereby actuate the service application valve device 12 and emergency application valve device 16 of the brake controlling valve device 9 to their normal or brake release positions. Chamber 40 below the equalizing piston 36 being connected to the brake pipe passage 40 will also become charged with fluid at the same pressure as the brake pipe 2.

Fluid under pressure from the rotary valve chamber 35 in brake valve device 10 will also flow through a port 47 in rotary valve 24 to passage 38 and thence to the equalizing reservoir 39 and equalizing piston chamber 37 to charge said reservoir and chamber with fluid at the same pressure as in the brake pipe. With the equalizing piston 36 thus subject on opposite sides to the same pressures of fluid, said piston will hold the discharge valve 44 seated.

Also in Release position of the brake valve device 10 no electrical circuits are established in the electric portion 22 whereby the release magnet 18 will be deenergized for venting the brake cylinder device 15.

Now let it be assumed that the handle 26 of the brake valve device 10 is turned to Service position. The release magnet 18 will thereby be energized to close the brake cylinder release vent and the service application magnet 19 will also be energized to effect an electro-pneumatic service application of brakes. The rotary valve 24 will also be in service position in which the brake pipe passage 41 and equalizing piston chamber 40 are disconnected from the fluid pressure supply in rotary valve chamber 35 and connected by way of a cavity 47a to an exhaust passage 48, and at the same time a cavity 49 in the rotary valve will connect equalizing reservoir passage 38 to an exhaust passage 50 to which the discharge valve passage 45 will also be open via a cavity 51 in the rotary valve. The consequent venting of fluid under pressure from the equalizing reservoir 39 and piston chamber 37 will reduce such pressure below the brake pipe pressure in chamber 40, as a result of which, the equalizing piston 36 will move up to unseat the discharge valve 44 whereupon fluid under pressure will also be vented from the brake pipe 2 past said valve to passage 45 and thence through cavity 51 in the rotary valve and exhaust passage 50 to atmosphere. It will be noted that fluid under pressure is vented from the brake pipe 2 via cavity 47a in the rotary valve as well as past the discharge valve 44, the vent via cavity 47a initiating the reduction in brake pipe pressure sooner than would be the case past said discharge valve, but due to the relatively large volume of the brake pipe 2 on a vehicle as compared to that of the equalizing reservoir 39, the reduction in pressure in said reservoir and equalizing piston chamber 37 will overtake and then lead the reduction in brake pipe pressure upon opening of the discharge valve 44 to permit the reduction in pressure in said reservoir to control the degree of reduction in pressure in the brake pipe 2, as will be later brought out.

If the service magnet 19 becomes energized and effects an application of brakes as intended upon movement of the brake valve handle 26 to service position, the reduction in pressure in brake pipe 2 effected as just described will be to no avail, but in case such an application of brakes fails to materialize, then the service portion 12 of the brake controlling valve device 12 will operate in response to the reduction in pressure in brake pipe 2 to effect an application of brakes.

When a desired degree of service brake application is obtained the brake valve handle 26 will be moved to Lap position to effect deenergization of the service application magnet 19 while holding the release magnet 18 energized. The supply of fluid to the brake cylinder device 15 will thereby be cut off while the release magnet remaining energized will hold the pressure in said brake cylinder device to maintain the brakes applied.

Also in Lap position of handle 26 the brake pipe 2 will be disconnected from the exhaust passage 48, the equalizing reservoir 39 will be disconnected from the exhaust passage 50 but the brake pipe discharge valve passage 45 will remain open to the exhaust passage 50 via cavity 50a. The reduction in pressure in the equalizing reservoir 39 and piston chamber 37 will thereby be terminated, but brake pipe pressure acting on the opposite side of the equalizing piston 36 will hold the discharge valve 44 open and permit fluid under pressure to continue to release from the brake pipe 2 until the pressure therein becomes reduced to substantially that still effective in equalizing piston chamber 37 whereupon the piston 36 will be operated to seat the discharge valve 44. If the application of brakes is due to the reduction in pressure thus affected in the brake pipe, the degree of such application will be correspondingly limited by operation of the service application valve device 12 in the well-known manner.

If it is desired to effect an increased application of brakes, the brake valve handle 26 may be moved from Lap position again to Service position to increase the application to the desired degree, and then be moved back to Lap position, as will be clear from the above description.

If due to energization of the release magnet 18 and service magnet 19 the brakes on the vehicle are applied and it is desired to restore the pressure in brake pipe 2 back to normal while holding the brakes thus applied, the brake valve handle 26 will be moved to Holding position in which the release magnet 18 will remain energized to hold the brakes applied, and in which via ports 46 and 47 in the rotary valve 24 the brake pipe 2 and equalizing reservoir 39 and thereby chambers 37 and 40 at opposite sides of the equalizing piston 36 will be recharged with fluid to the pressure normally carried in the brake pipe. It will be apparent that if the application of brakes were due to the previous reduction in pressure in brake pipe 2, the recharging the brake pipe in Holding position would release such application, that is, the Holding position is only for the purpose above described and is of no account when the application is due to a reduction in pressure in brake pipe 2.

In order to release an application of brakes, the brake valve handle 26 will be returned to Release position for deenergizing the release magnet 18 and for recharging the brake pipe 2 in the same manner as in Holding position, if not already so charged, whereupon the release of brakes will occur due either to operation of said magnet or the increase in pressure in the brake pipe, as the case may be.

If it is desired to effect an emergency application of brakes the brake valve handle 26 will be moved to Emergency position for energizing the release magnet 18 and emergency magnet 20 and for at the same time opening the brake pipe passage 41 to the exhaust passage 50 via cavity 52 in the rotary valve whereby in either case an emergency reduction in brake pipe pressure will occur to cause operation of the emergency portion 16 of the brake controlling valve device 9 to effect an emergency application of brakes on the vehicle.

In order to release the brakes after an emergency application the brake valve handle 26 may be returned to Release position, or first to Holding position, if desired, whereupon the release will occur in the same manner as above described.

According to the invention, I provide adjacent the brake valve devices 10, 10a two identical pilot valve devices 53, 53a in addition to the brake application valve devices 43, 43a, respectively.

Each brake application valve device 43, 43a comprises a casing and two coaxially arranged and spaced apart pistons 56, 57 of different areas slidably mounted in said casing and connected together by a hollow stem 58. Between the pistons 56, 57 is a chamber 59 open to pipe 42 from the respective brake valve device. In the opposite face of piston 57 is a valve 60 arranged to cooperate with an annular seat rib 61 for closing communication between an exhaust passage 62 encircled by said rib and open to atmosphere, and an annular cavity 63 encircling said rib. At the opposite side of piston 56 is a chamber 64 open to a control pipe 65 and also open through a relatively small port 66 in said piston to chamber 59, the chamber 64 containing a spring 67 acting on the two pistons for urging them to their normal position in which valve 60 is in sealing contact with seat 61. With the piston 57 in this normal position a pipe 67 open to brake pipe 2 is also open through one or more casing ports 68 to chamber 59. The pistons 56, 57 are slidable from their normal position to another position defined by contact of a rib 69 on the outer face of piston 56 with a gasket 70 and in which other position the piston 57 is adapted to be disposed at the opposite side of ports 68 for disconnecting said ports from chamber 59 and opening same to cavity 63 and thereby atmosphere through passage 62.

The control pipe 65 at each end of the vehicle leads to the respective pilot valve device 53 or 53a. Each of these pilot valve devices comprises a casing having a chamber 72 containing a valve 73 provided on one end of a plunger 74 which is slidably mounted in the casing. The plunger 74 is relieved adjacent the valve 73 to provide an annular cavity 75, said valve controlling communication between said cavity and the chamber 72. A spring 76a in chamber 72 acts on valve 73 for urging it towards its seat. A passage 76 extending axially through the valve 73 and plunger 74 is open at one end to chamber 72 while its opposite end is open to a chamber 78 through a seat for a valve 79 contained in the latter chamber. The valve 79 is connected to one end of a stem 80 slidably mounted in a bore through a partition wall 81 separating chamber 78 from a chamber 81a which is open to atmosphere through a port 82. The opposite end of stem 80 in chamber 81 is provided with a follower head 83 engaging one side of a flexible diaphragm 84 which is clamped around its periphery in the casing. At the opposite side of diaphragm 84 is a chamber 85 open to brake pipe 2. A spring 86 in chamber 81 acts through the follower head 83 on diaphragm 84 with a chosen force.

At each end of the vehicle valve chamber 78 in the respective pilot valve device 53 or 53a is connected to the respective control pipe 65, the annular cavity 75 is open to atmosphere through a port 87 while valve chamber 72 is connected by a pipe 88 to a passage 89 in the respective brake valve device 10, 10a.

The passage 89 in each brake valve device constitutes a passage already present, but not used, in the brake valve device of the "AMUE" brake equipment and the rotary valve 24 of said brake valve devices is also provided with passages 90 and 91 for connecting passage 89 to the exhaust passage 50 in, respectively, the Release and Handle Off positions, said rotary valve lapping said passage 89 in all other positions of the rotary valve. According to the invention the pipe 88 is connected to this already present passage 89 in the brake valve device, as just mentioned, and a plug 92 is placed in the already present passage 91 in the rotary valve 24 to close communication therethrough for a reason which will be later brought out.

According to the invention I further provide at opposite ends of the brake equipment automatic closing trip valve devices 93, 93a, each of which is connected to the brake pipe 2 through a conduit 94 and a T connection 95 containing a check valve (not shown) arranged to permit flow of fluid under pressure in the direction from brake pipe 2 to said trip valve device but to prevent flow in the opposite direction. The trip valve devices 93, 93a, and T connections 95 are identical to those employed in the "SMEE" brake equipment heretofore referred to, each trip valve device comprising a normally depending arm 96 adapted upon engagement with a road bed trip (not shown) to be swung out of its depending position to open the brake pipe 2 to atmosphere and which is adapted to automatically return to its depending position and close communication between brake pipe and atmosphere when pressure of fluid in the brake pipe is reduced to a chosen low degree.

In operation, assuming that the brake pipe 2 is charged with fluid under pressure, pressure of fluid from said brake pipe present in chamber 85 of each pilot valve devices 53, 53a will deflect the diaphragm 84 therein against spring 86 to seat valve 79 on plunger 74 and shift said plunger against spring 76a to unseat the valve 73 thereby opening the connected pipe 88 to atmosphere through passage 87. Assuming that the brake valve device 10 is selected for controlling the vehicle and that the handle 26 thereof is in release position supplying fluid under pressure to pipe 42 and thence chamber 59 in the brake application valve device 43, the pressure of such fluid will equalize through port 66 in piston 56 into chamber 64 and pipe 65, the valve 79 in the pilot valve device 53 being seated as above mentioned. As a result, the spring 67 will hold the pistons 56, 57 in their normal position opening chamber 59 to ports 68 and thereby opening the respective pipe 42 to the brake pipe 2. At the non-control end of the vehicle the parts of the brake application valve device 43a will also be in their normal position, for reasons which will be later brought out, and fluid under pressure supplied to the brake pipe 2 at the control end will flow through ports 68 in said device to chamber 59 and thence equalize through port 66 in chamber 64 and pipe 65 whereby the spring 67 therein will hold the pistons in their normal position.

If while the vehicle is moving a track trip should contact handle 96 of the trip valve device 93, said handle will be swung out of its normal depending position to open the brake pipe 2 to atmosphere and maintain such opening until the pressure in the brake pipe is reduced to a very low degree at which time said handle will return to its normal position and disconnect the brake pipe from atmosphere. When the pressure of fluid in the brake pipe and thereby in diaphragm chamber 85 of the pilot valve devices 53, 53a is reduced by the trip valve device 93 to a degree lower than a full service reduction, spring 86 in said pilot valve devices will deflect the diaphragm 84 upward to open valve 79 and to permit closing of valve 73 by spring 76a for thereby opening the connected pipe 65 and application piston chamber 64 past the unseated valve 79 and through bore 76 and valve chamber 72 to pipe 88. At the control brake valve device 10 where the handle 26 is in release position the connected pipe 88 being open to atmosphere via passage 90 in the rotary valve and passage 59, fluid under pressure will therefore be vented from chamber 64 in the application valve device 43 at a rate exceeding the rate of supply through port 66, as a result of which, the pressure of fluid in said chamber will become reduced sufficiently below that in chamber 59 to move the piston 56 and thereby the piston 57 to their upper position. This operation of the brake application valve device 43 will disconnect brake pipe 2 from the respective pipe 42 which is still supplied with fluid under pressure by the brake valve device 10 in release position, and at the same time open the brake pipe to atmosphere through port 62, thereby preventing further supply of fluid under pressure to the brake pipe and effecting complete venting thereof to cause operation of the brake controlling valve device 9 to effect an emergency application of brakes.

At the non-control end of the vehicle, when pipe 65 is connected by operation of the pilot valve device 53a to pipe 88 which is open to passage 91 containing plug 92 in the rotary valve 24 of the brake valve device 10a, the pressure of fluid in pipe 65 and chamber 64 of the brake application valve device 43a will merely equalize into pipe 88 and may not even effect a sufficient reduction in pressure in said chamber to cause movement of the parts of said brake application valve device. Whether such parts move or not at the non-control end of the vehicle is however immaterial since the operation of the brake application valve device 43 at the control end of the vehicle will ensure the desired emergency application of brakes. If the parts of the brake application valve device 43a do operate however, equalization of pressures on opposite sides of piston 56 therein will promptly occur through the respective port 66 and permit spring 67 to return said parts to their normal position.

With handle 26 of the control brake valve device 10 still in release position after the emergency application of brakes there will be an undesired leak of fluid under pressure to atmosphere via respective pipe 42, port 66 in the brake application valve device 43, the connected pipe 65, the pilot valve device 53 and pipe 88. To stop this leak the brake valve handle will be operated to turn the rotary valve 24 in brake valve device 10 to Lap position to cut off the supply of fluid under pressure to the connected pipe 42 and close off the end of passage 89. Through port 66 in the brake application valve device 43 the pressures on opposite sides of piston 56 and thereby in the connected pipes 42 and 65 will then equalize and permit spring 67 to return the parts of said device to normal position for disconnecting the brake pipe 2 from the atmospheric port 62 and connecting said brake pipe to said pipe 42.

In order to release an application of brakes effected by operation of the trip valve device 93, as just described, the handle 26 of the controlling brake valve device 10 must be turned from Lap position to Holding position for again supplying fluid under pressure to the connected pipe 42 and chamber 59 in the brake application valve device 43 but in which position the end of passage 89 is still closed by the rotary valve 24. Fluid under pressure thus supplied to chamber 59 in the brake application valve device 43 will equalize through port 66 therein into chamber 64 and the connected pipe 65 and thence through the pilot valve device 53 into the connected pipe 88, the flow capacity of said port 66 being such as to permit the pressure to thus increase in chamber 64 at such a rate as to enable spring 67 to hold the pistons 56, 57 in their normal position and permit fluid under pressure to also flow from chamber 59 to the brake pipe 2 for recharging same.

At the non-control end of the vehicle the fluid supplied to the brake pipe at the control end will flow into the chamber 59 of the brake application valve device 43a and thence to the connected pipe 42 which is lapped by the respective brake valve rotary valve 24, and at the same time through port 66 to the connected pipe 65 and thence through the pilot valve device 53a to the connected pipe 88 and passage 89 in the rotary valve 24 of the brake valve device 10a. In the brake valve device 10a the passage 89 is open to port 91 in the rotary valve 24 when said rotary valve is in Handle off position but said port is closed by plug 92 whereby through port 66 in the brake application valve device 43a the fluid pressures will equalize on opposite sides of the respective piston 56 to permit spring 67 to hold the parts of said brake application valve device in their normal position in order that the brake pipe 2 can be recharged with fluid under pressure from the brake valve device 10. It will be seen that if the plug 92 were not employed, the fluid under pressure supplied to the brake pipe at the control end of the vehicle would be vented to atmosphere at the non-control end through the passage containing said plug and thereby prevent recharging of the brake equipment and obtaining a release of the brakes on the vehicle.

After the pressure of fluid in the brake pipe is increased by the supply through the brake valve device 10 to a degree which, acting in each of the pilot valve devices 53, 53a on diaphragm 84 is sufficient to overcome the opposing pressure of spring 86, said diaphragm will deflect against said spring and close valve 79 and open valve 73. At each pilot valve device this merely disconnects the connected pipes 65 and 88 from each other and opens said pipe 88 to atmosphere without any effect on the brake application valve devices 43, 43a. However, as soon as the pilot valve device 53 operates as just mentioned to disconnect the connected pipes 65, 88 from each other, the controlling brake valve device 10 may then be returned to Release position in which the connected pipe 88 is again vented through the passages 90 and 50 therein. It will be seen that in recharging the brake equipment it is necessary that the controlling brake valve device 10 remain in Holding position lapping passage 89 until the pilot valve device 53 operates to disconnect the respective pipes 65 and 88, so that the parts of the brake application valve device 43 will remain in their normal position to permit such recharging, but as soon as the pilot valve device 53 operates in response to increasing brake pipe pressure to close communication between the pipes 65 and 88 the parts of the brake application valve device 43 will remain in their normal position upon movement of the brake valve handle 26 to Release position. In other words, in order to release an application of brakes it is necessary that the brake valve handle 26 be moved to Holding position until the pilot valve device 53 operates after which it will be moved to Release position.

If the brake valve device 10a is at the selected control station, the plug switch 33 will be applied at said station and the operation of the equipment embodying the invention will be the same as when controlling from the brake valve device 10, as will be clear from the above description.

*Summary*

It will now be seen that by the addition of plug 92 and use of passage 89 existing in the brake valve device of the "AMUE" brake equipment and adding thereto the brake application valve devices 43, 43a and pilot valve devices 53, 53a, that automatic closing trip valve devices 93, 93a may be employed in connection with said equipment, since said brake application valve device will automatically cut off supply of fluid under pressure to and vent the brake pipe in response to operation of said trip valve devices so as to ensure an application of brakes which will positively be retained until it is desired to release same.

Having now described my invention, what I claim as new and desire to secure by Letters Patent, is:

1. In a fluid pressure brake equipment, in combination, a brake pipe, an operator's brake valve device having a position for supplying fluid under pressure to said brake pipe, valve means controlling the supply of fluid under pressure from said brake valve device to said brake pipe and operative upon a reduction in pressure in a chamber to cut off such supply, other valve means cooperative with said brake valve device to serially control a communication for reducing the pressure of fluid in said chamber, means operative by fluid in said brake pipe at and exceeding a chosen degree to operate said other valve means to close said communication and operative upon a reduction in brake pipe pressure to a lower degree to open said communication, said brake valve device opening said communication in its said position and having another position for closing said communication, and an automatic closing trip valve device for effecting a reduction in pressure in said brake pipe to said lower degree.

2. In a fluid pressure brake equipment, in combination, a brake pipe, an operator's brake valve device having a position for supplying fluid under pressure to said brake pipe, valve means controlling the supply of fluid under pressure from said brake valve device to said brake pipe and operative upon a reduction in pressure in a chamber to cut off such supply, means associated with said valve means for opening a vent from said brake pipe upon operation of said valve means to cut off said supply, other valve means cooperative with said brake valve device to serially control a communication for reducing the pressure of fluid in said chamber, means operative by fluid in said brake pipe at and exceeding a chosen degree to operate said other valve means to close said communication and operative upon a reduction in brake pipe pressure to a lower degree to open said communication, said brake valve device opening said communication in its said position and having another position for closing said communication, and an automatic closing trip valve device for effecting a reduction in pressure in said brake pipe to said lower degree.

3. In a fluid pressure brake equipment, in combination, a brake pipe, an operator's brake valve device having a position for supplying fluid under pressure to said brake pipe, valve means controlling the supply of fluid under pressure from said brake valve device to said brake pipe and operative upon a reduction in pressure in a chamber to cut off such supply, pilot means comprising movable abutment means subject to pressure of fluid in said brake pipe, and a valve connected to said movable abutment means controlling a fluid pressure vent from said chamber and operative by said abutment when pressure of fluid in said brake pipe is in excess of a chosen degree to close said vent, means for actuating said valve to open said vent upon a reduction in pressure in said brake pipe to below said chosen degree, and an automatic closing trip valve device for effecting such reduction in pressure of fluid in said brake pipe.

4. In a fluid pressure brake equipment, in combination a brake pipe, an operator's brake valve device having two positions for supplying fluid under pressure to said brake pipe, an application valve device controlling communication through which fluid under pressure is supplied to said brake pipe by said brake valve device and operative upon a reduction in pressure in a chamber to close said communication, an automatic closing trip valve device for effecting a reduction in pressure in said brake pipe, pilot means responsive to a reduction in pressure in said brake pipe to below a chosen degree to establish a communication from said chamber to said brake valve device and responsive to pressure of fluid in said brake pipe at and exceeding said chosen degree to close such communication, said brake valve device comprising means operative in one of its said two positions to open the last named communication to atmosphere and in the other of its two positions to disconnect said last named communication from atmosphere, and means for supplying fluid under pressure to said chamber in said two positions of said brake valve device.

5. In a fluid pressure brake equipment, in combination, a brake pipe, an operator's brake valve device having two positions for supplying fluid under pressure to said brake pipe and a third position for cutting off supply of fluid under pressure to said brake pipe, an application valve device controlling communication through which fluid under pressure is supplied to said brake pipe by said brake valve device and operative in response to a reduction in pressure in a chamber to close said communication, a pipe, said brake valve device comprising means for opening said pipe to atmosphere in one of its said two positions and for disconnecting said pipe from atmosphere in its other of said two positions, pilot valve means operative by pressure of fluid in said brake pipe at and exceeding a chosen degree to close communication between said chamber and pipe and responsive to a reduction in pressure in said brake pipe to below said chosen pressure to open said chamber to said pipe, an automatic closing trip valve device for effecting a reduction in pressure of fluid in said brake pipe, and means for operating said application valve device to open the first named communication upon disconnecting said pipe from atmosphere by said brake valve device and upon disconnecting said chamber from said pipe.

6. In a fluid pressure brake equipment, in combination, a brake pipe, an operator's brake valve device having two positions for supplying fluid under pressure to said brake pipe and a third position for preventing supply of fluid under pressure to said brake pipe, an application valve device controlling communication through which fluid under pressure is supplied by said brake valve device to said brake pipe and comprising a movable abutment subject to pressure of fluid provided by said brake valve device and an opposing fluid pressure in a chamber and operative upon a reduction in said opposing fluid pressure to close said communication and upon substantial equalization of the opposing pressure to open said communication, fluid pressure supply means opening said chamber to said communication at the brake valve side of said movable abutment, an automatic closing trip valve device for effecting a reduction in pressure in said brake pipe, pilot valve means controlled by pressure of fluid in said brake pipe and operative upon a reduction in pressure therein to below a chosen degree to open said communication to a pipe and operative by pressure in said brake pipe in excess of said chosen degree to disconnect said communication from said pipe, said brake valve device comprising means for opening said pipe to atmosphere in one of its said two positions and for disconnecting said pipe from atmosphere in its other positions.

7. In a fluid pressure brake equipment, in combination, a brake pipe, an operator's brake valve device having two positions for supplying fluid under pressure to said brake pipe and a third position for preventing supply of fluid under pressure to said brake pipe, an application valve device controlling communication through which fluid under pressure is supplied by said brake valve device to said brake pipe and comprising a movable abutment subject to pressure of fluid provided by said brake valve device and an opposing fluid pressure in a chamber and operative upon a reduction in said opposing fluid pressure to close said communication and upon substantial equalization of the opposing pressures to open said communication, fluid pressure supply means opening said chamber to said communication at the brake valve side of said movable abutment, an automatic closing trip valve device for effecting a reduction in pressure in said brake pipe, pilot valve means controlled by pressure of fluid in said brake pipe and operative upon a reduction in pressure therein to below a chosen degree to open said communication to a pipe and operative by pressure in said brake pipe in excess of said chosen degree to disconnect said communication from said pipe, said brake valve device comprising passageways for opening said pipe to atmosphere in one of its said two positions and its said third position and for disconnecting said pipe from atmosphere in the other of its two positions, and a plug in the passageway effective in said third position closing communication therethrough.

CHAUNCEY O. DE WITT.

REFERENCES CITED

The following references are of record in the file of this patent:

UNITED STATES PATENTS

| Number | Name | Date |
| --- | --- | --- |
| 2,081,465 | Stewart | May 25, 1937 |
| 2,299,476 | Farmer | Oct. 20, 1942 |